July 10, 1962 — E. E. HEWITT — 3,043,321
CONTROL SYSTEM EMBODYING VIBRATION RESPONSIVE VALVE DEVICE
Filed July 3, 1959
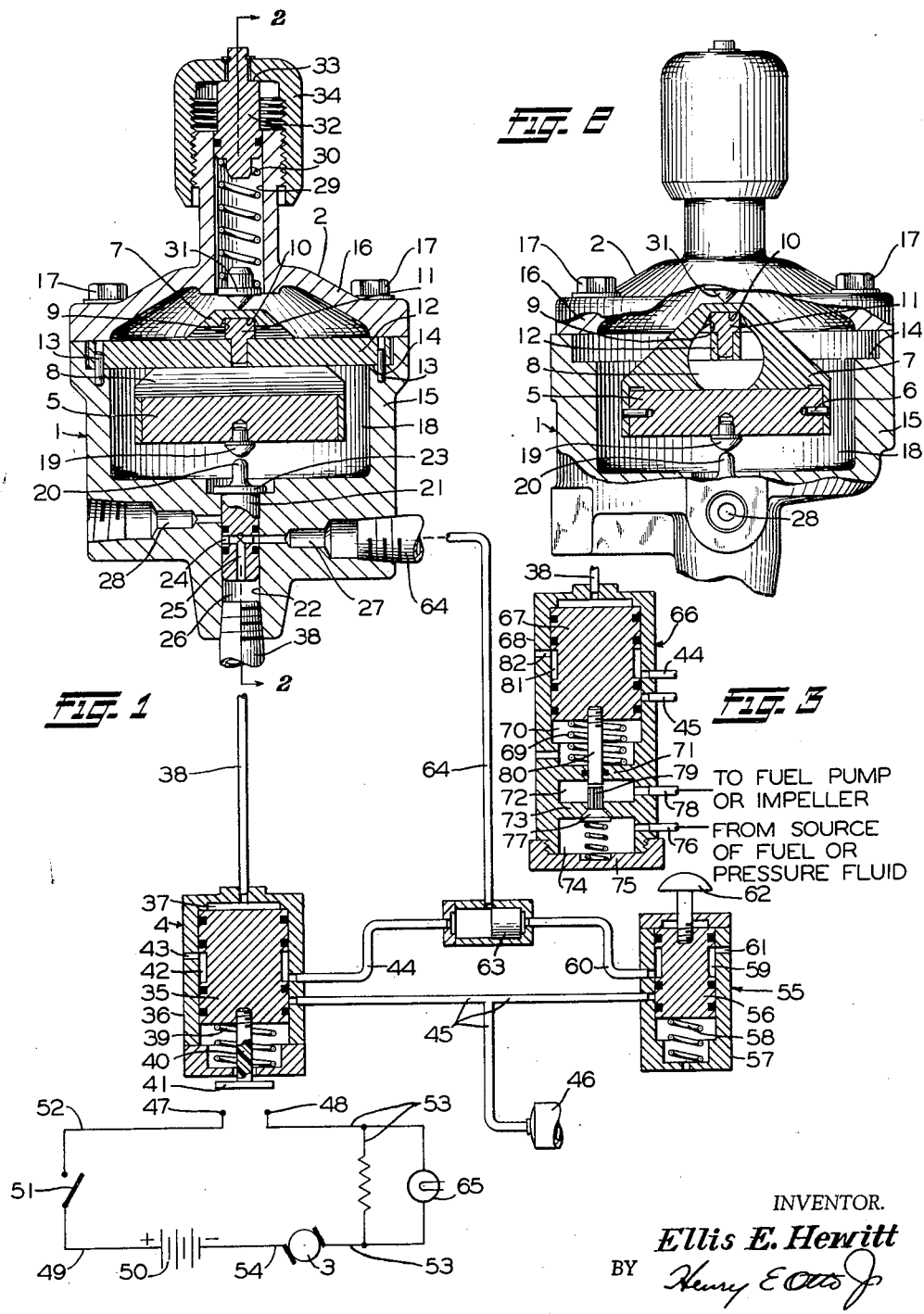
INVENTOR.
Ellis E. Hewitt
BY Henry E. Otto Jr.
Attorney

United States Patent Office 3,043,321
Patented July 10, 1962

3,043,321
CONTROL SYSTEM EMBODYING VIBRATION
RESPONSIVE VALVE DEVICE
Ellis E. Hewitt, Ruffsdale, Pa., assignor to Westinghouse
Air Brake Company, Wilmerding, Pa., a corporation of
Pennsylvania
Filed July 3, 1959, Ser. No. 824,857
8 Claims. (Cl. 137—46)

This invention relates to control systems automatically operative to shut off the supply of activating energy (such as electrical energy, pressure fluid or fuel) to an engine upon a malfunction-caused abnormal degree of vibration or inertia of a vibration-sensing part (such as the housing) of such engine, the invention relating more particularly to an improved system of the above general type embodying a novel inertia or vibration responsive device and a shut-off device controlled thereby.

It has heretofore been proposed to provide magnetic-circuit-type vibration responsive systems embodying an armature rockable on a pivot in one direction by a preadjustable spring force and in the opposite direction by an electro-magnet. When vibration exceeds a preselected level, the inertial force on the armature plus the spring force will pull the armature away from a stop pin and increase the air gap between the magnet and armature, causing the armature to strike a latch or hold-off magnet and actuate a switch to shut down the engine. The device is reset by energizing a reset coil or depressing a reset button to drive the armature down to the stop pin.

The principal object of this invention is to provide an improved control system of the above general type which is less expensive than and requires less maintenance than the magnetic-circuit types heretofore proposed, and embodies a pendulum-like weight subject to a vibration-resisting force which is adjustable to control the degree of sensitivity of said device and assure against undesired shut-off operation thereof when the engine is started.

According to this object, the control system comprises a universally swingable pendulum-like weight means suspended on a bearing pin or pivot that is rigidly secured to such as the housing of a rotary or reciprocating engine or the like. Coaxially secured to the lower end of the weight means is an inverted cone-shaped element having a tip that normally coaxially abuts the tip of a valve member for thereby maintaining said valve member in a position in which a chamber is connected to a supply port and cut off from a vent port. Means, such as a helical spring acting through a conical seat or a selectable fluid pressure acting through a cone-shaped member, are provided to apply a downward force of selectable magnitude on the weight means to stabilize the latter against swinging or tilting relative to the bearing pin, whereby the degree of vibration necessary to cause swinging of the weight means will vary directly with the magnitude of said force. When the weight means swings out of vertical, a bias pressure will drive the tip of the valve member up along the conical surface of said element, thereby shifting said valve member to an abnormal position in which said chamber is connected to the vent port and cut off from the supply port. A shut-off device is operative to respectively permit or shut off the supply of electrical or other energy to the engine according to whether pressure in said chamber exceeds or is less than a chosen value. The shut-off device when in its supply-permitting position preferably establishes a lock-over communication whereby supply of pressure fluid will be maintained to said chamber via said supply port so long as said valve member does not shift to abnormal position; and said shut-off device when in shut-off position preferably vents the supply port, for reasons hereinafter to be described.

Other objects and advantages will become apparent from the following more detailed description of the invention and from the accompanying drawing, wherein: FIG. 1 is a diagrammatic view of a control system, including a vibration responsive valve device and a shut-off device, illustrating one form of the invention; FIG. 2 is a view of said valve device taken along the line 2—2 of FIG. 1; and FIG. 3 is a diagrammatic view of a modified shut-off device which may be used in lieu of that shown in FIG. 1 to provide a control system illustrating another form of the invention.

*Description—FIGS. 1 and 2*

According to this embodiment of the invention, the control system comprises a vibration responsive valve device 1 having a hollow sectionalized casing 2 which is rigidly secured to a vibration-sensing part such as the housing, of an electrically controlled or driven engine, such as an electric motor 3, and responds to a malfunction-induced excessive vibration of said housing to cause a shut-off device 4 to operate to break an electrical ignition circuit for effectively stopping said motor.

Valve device 1 comprises a preferably cylindrical weight 5 of any suitable heavy or high specific gravity metal, such as lead, tungsten, or alloys of these metals, suitably secured as by a plurality of pins 6, within a coaxially arranged bore in a sleeve-like extension projecting downwardly from, and formed integrally with, the lower end of a generally truncated cone-shaped weight carrying member 7 having a transverse through opening 8. The member 7 has a coaxially-arranged counterbore-like recess defined by a beveled side wall 9 that at its lower end intersects the upper part of opening 8 and at its upper end terminates in a flat surface or base 10. The weight-carrying member 7 and hence weight 5 are suspendingly carried on a pivot-like bearing pin 11 that has a flat head engaging the base 10 of said recess and has a reduced diameter shank that extends downwardly into a vertical bore through the center of a support rod 12 of preferably rectangular cross section that extends horizontally with substantial clearance through opening 8. Adjacent its respective ends, rod 12 is staked by a pair of vertical dowel pins 13 to an annular ledge or support shoulder 14 provided in a lower portion 15 of casing 2, and said rod is clamped between said shoulder and an upper casing portion 16 (such as by cap screws 17 which secure the casing portions 15, 16 together), for rigidly connecting the rod 12 to the casing 2. The casing portions 15, 16 cooperate to define a chamber 18 which encloses the rod 12, bearing pin 11, member 7 and weight 5.

Extending coaxially downward from the lower end of weight 5 is an inverted cone-shaped element 19 preferably having a slightly rounded tip at its lower end. When weight 5 is in a normal position, in which it is shown, the tip of element 19 will be coaxially aligned with and not quite abut the rounded upper tip 20 of a valve member 21 that is sealingly reciprocable in an aligned bore 22 in the lower end wall of casing portion 15, whereby said valve member will be biased by gravity to a lowermost position, in which it is shown, defined such as by contact of a retaining ring or a valve collar 23 with a stop shoulder that encircles bore 22. Valve member 21 has an annular cavity 24 constantly open via suitable radial ports to a central bore-like passageway 25 extending upwardly through said valve member from a chamber 26 adjacent the lower end of said valve member. When valve member 21 is in its lowermost position, cavity 24 will register with a valve port 27 for connecting the latter to chamber 26; whereas when said valve member is in an abnormal position, cavity 24 will be cut off from port 27 and uncovered to a vent port 28 for venting chamber 26.

Arranged coaxially with bore 22 is a bore 29 that extends from chamber 18 through an upwardly extending cylindrical part of upper casing portion 16. Disposed in bore 29 is a helical spring 30 that at its lower end bears against a spring seat 31 having a depending inverted cone-shaped tip that makes point contact with the axial center of the upper end of weight-carrying member 7. The upper end of spring 30 bears against a cylindrical plunger 32 that is slidably mounted in bore 29, and projects exteriorly thereof and of the casing portion 16, and adjacent its projecting end has an inwardly directed radial shoulder 33 that is pressed by spring 30 into contact with the inner end wall of an internally threaded cap nut 34 that is screw-threaded onto the aforementioned cylindrical part of casing 16. By rotating the cap nut 34, the axial position of the plunger 32 may be adjusted for thereby adjusting to a desired value the bias exerted by spring 30 on the weight-carrying member 7.

It will be noted that by virtue of the clearance between the beveled side wall 9 and the cylindrical head of pin 11, and the clearance between the rod 12 and wall of opening 8, the weight-carrying member 7 and hence weight 5 are universally swingable or tiltable, in the manner of a pendulum, relative to the pivot-like bearing pin 11, but that such swinging or tilting will be resisted according to the magnitude of the bias force operatively exerted by spring 30 on weight 5 through the conical tip of seat 31. Hence, the degree of sensitivity of the device 1 can be increased or decreased, as desired, by reducing or increasing respectively, the preselected bias effect of spring 30, so that the weight 5 will not be swung out of its neutral or normal position, in which it is shown, unless vibration of the engine on which said device is mounted exceeds a degree which is abnormal for that particular engine.

Shut-off device 4 may comprise a spool-type valve 35 sealingly reciprocable in a bore in a sectionalized casing 36 and subject at one side to pressure of fluid in a chamber 37 connected via a pipe 38 to chamber 26 and subject at the opposite side to pressure of a helical spring 39 in an atmospheric chamber. Coaxially connected to the spring side of valve 35 is a rod 40 that is formed of a non-conducting material, such as polyethylene plastic, and projects exteriorly of the casing 36 and at its projecting end is connected to a disc-shaped metal switch 41.

When chamber 37 is vented, spring 39 will bias valve 35 to a shut-off position, in which it is shown. In this position, an elongated annular cavity 42 in valve 35 will be so disposed as to connect a vent port 43 to a pipe 44 and disconnect said pipe from a supply pipe 45 leading to a reservoir 46 or other source of fluid under pressure; and switch 41 will be retracted out of contact with two terminals 47, 48 of an electrical ignition circuit for the motor 3 so as to break said circuit and cause shutdown of the motor. This circuit may comprise a wire 49 connecting the positive terminal of a source of electrical energy, shown illustratively as a battery 50, to one terminal of a manually oprable switch 51 which is closable to connect wire 49 to a wire 52 connected to terminal 47; a wire 53 connecting terminal 48 with one terminal of motor 3; and a wire 54 connecting the other terminal of the motor with the negative terminal of the battery.

The control system also comprises a reset valve device 55 which may comprise a spool-type valve 56 sealingly reciprocable in a sectionalized casing 57 and biased by a helical spring 58 to a normal or closed position, in which it is shown, and in which the elongated annular cavity 59 in said valve connects a pipe 60 to a vent port 61 and laps one branch of supply pipe 45. By application of a depressing force to a plunger 62, valve 56 is manually shiftable against the force of spring 58 to an open position in which pressure fluid is supplied via pipe 45 to pipe 60. A double check valve or shuttle valve 63 is sealingly reciprocable in a sectionalized casing and operative to selectively connect pipe 44 or pipe 60 to a pipe 64 according to which of pipes 44 or 60 is charged with fluid at the preponderant pressure, and henec to vent pipe 64 when pipes 44 and 60 are concurrently vented.

*Operation—FIGS. 1 and 2*

Assuming initially that the motor 3 is intentionally shut down, all components will be in the respective positions in which they are shown in FIG. 1. To start the motor 3, the manual ignition switch 51 is closed, and the plunger 62 of reset valve device 55 is depressed for causing valve 56 to permit pressure fluid to flow from supply pipe 45 via valve cavity 59, pipe 60, shuttle valve 63, and pipe 64 to port 27, and thence via cavity 24 of valve member 21 in lowermost position, chamber 26 and pipe 38 to chamber 37 of shut-off device 4 for shifting shut-off valve 35 against resistance of spring 39 to a normal position, when pressure in chamber 37 exceeds a chosen value. When in normal position, valve 35 will operatively hold switch 41 in contact with the terminals 47, 48 for completing closure of the motor circuit and hence causing the motor 3 to start operating; and pressure fluid will flow in bypass of reset valve 56 through a lock-over communication including supply pipe 45, valve cavity 42 and pipe 44, to one end of shuttle valve 63, so that when the operator removes his hand from plunger 62 (which should now be done), the pipe 60 will be vented, and shuttle valve 63 will shift for causing pressure fluid to continue to be supplied via pipe 44 to pipe 64 so that chamber 37 will be maintained charged for holding valve 35 in its normal position.

Meanwhile, when pressure in chamber 26 exceeds a chosen lower value, valve member 21 will be shifted upwardly thereby a very slight distance to a normal position, defined by abutting contact of tip 20 with the slightly rounded conical tip of element 19; however, valve cavity 24 will still register exclusively with port 27 for effecting the same fluid pressure connections as established in the lowermost position of valve member 21. The pressure of fluid thus supplied to chamber 26 acting over the lower end of valve member 21 does not exert a force on the heavy weight 5 sufficient to shift the latter upwardly against the force of spring 30 even when the preselected bias of the latter is at a minimum.

So long as vibration of the housing of motor 3 and hence of the affixed casing 2 of device 1 is within a permissible limit, as predetermined by the preselected bias force of spring 30, said spring will operatively resist and prevent swinging or tilting of the weight 5, and the valve member 21 will remain in normal position for maintaining chamber 37 of device 4 charged via the lock-over communication 45, 42, 44. However, if vibration of the motor housing exceeds said preselected permissible limit, such as due to bearing failure or other malfunction, the weight 5 will tilt on bearing pin 11 relative to the sharp conical tip of spring seat 31 (as permitted by the beveled side wall 9 and clearance between the support rod 12 and wall of opening 8, as above described) and thereby swing the tip of element 19 out of coaxial contact with valve tip 20. Pressure of fluid in chamber 26 acting on the lower end of valve member 21 will thus be effective to drive tip 20 up along the conical side of element 19, until it contacts the lower end of weight 5 for thereby shifting said valve member to its abnormal position, in which port 27 is lapped and chamber 26 and hence chamber 37 are connected via valve cavity 24 to vent port 28.

As soon as pressure in chamber 26 and hence in chamber 37 drops below the aforementioned chosen value (as determined by the bias effect of spring 39), shut-off valve 35 will be biased by said spring to its shut-off position, in which it will operatively retract switch 41 for opening the electrical circuit for motor 3 to cause the latter to stop running, and in which the lock-over communication 45, 42, 44 is closed and pipe 44 is vented. Since pipe 60 is already vented, the shuttle valve 63 will not shift, and hence pipe 64 will be vented via the then vented pipe 44.

Pressure in chambers 37, 26 will continue to blow down via vent port 28 of device 1 until pressure in said chambers drops to the aforementioned chosen lower value; whereupon valve member 21 will drop down, due to gravity, to its previously-defined lowermost position, for permitting the weight 5 to swing back to its neutral position without lateral interference of element 19 with tip 20; and chamber 26 will be cut off from vent port 28 and reconnected to the then vented supply port 27.

The shut-off device 4 will thus remain in its shut-off position and indefinitely maintain the motor 3 cut out of operation. After the motor has been repaired, it may be put into operation by following the starting procedure above described.

If the motor 3 is not periodically attended and it is desired to notify a supervisor in a remote location that the motor has shut down, an indicator lamp 65 may be located on a panel at said location and connected in parallel with wire 53 of the motor circuit, such that said lamp will go out if the motor shuts down due to opening of the motor circuit for any cause, including excessive vibration. If the lamp 65 is used, a resistor should of course be included, as shown in FIG. 1, in series with the part of wire 53 that shunts the lamp so that said lamp will light up.

*Description and operation—FIG. 3*

This embodiment of the invention differs from that shown in FIGS. 1 and 2 in that a shut-off valve 66 is substituted in the system shown in FIG. 1 in lieu of the shut-off device 4, for controlling closure of a fluid-conveying communication instead of opening of an electrical circuit.

Device 66 may comprise a spool-type valve 67 sealingly reciprocable in a bore in a sectionalized casing 68 and subject opposingly to pressure of fluid in pipe 38 and to pressure of a helical spring 69 in an atmospheric chamber 70. Chamber 70 is separated by a casing partition 71 from a delivery chamber 72 that, in turn, is separated by a casing partition 73 from an inlet chamber 74 that is enclosed by a cap nut 75. Inlet chamber 74 is connected to an inlet pipe 76 connected to a source (not shown) of fuel for a diesel or gas-operated engine or a source (not shown) of a hydraulic or gaseous fluid under pressure for driving a turbine. A poppet-type valve 77 disposed in chamber 74 is spring-biased into contact with a tapered annular valve seat in casing partition 73 for shutting off flow of pressure fluid from pipe 76 to delivery chamber 72. Chamber 72 is connected to a pipe 78 that leads to a fuel pump (not shown) of a diesel or gas-operated engine or to the impeller (not shown) of a turbine, as the case may be. Valve 77 has a coaxially connected fluted stem 79 that projects into chamber 72 and is abuttingly engageable by one end of a coaxially aligned rod 80 that intermediate its ends has sealing, slidably guided contact with the wall of an aligned bore through casing partition 71 and at its opposite end is coaxially connected to the spring side of valve 67.

When pressure in pipe 38 is less than a chosen value, valve 67 will be biased by spring 69 to a shut-off position, in which a branch of pipe 45 is lapped and an elongated annular cavity 81 in said valve connects pipe 44 to a vent port 82. Also, with valve 67 in shut-off position, the rod 80 will be retracted out of abutment with the fluted stem 79 for permiting closure of valve 77 by its bias spring and, by thus cutting off the flow of the energy medium (fuel or fluid under pressure) from pipe 76 to the delivery pipe 78, cause shut-down of the engine (such as a diesel or gas-operated engine, or a turbine) to which pipe 78 is connected. When pressure in pipe 38 exceeds said chosen value, valve 67 will be shifted against the force of spring 69 to a normal position, in which pipe 44 is cut off from a vent port 82, valve cavity 81 connects pipe 45 to pipe 44 for establishing a lockover communication 45, 81, 44 similar to that established by device 4 of FIG. 1, and valve 77 is held operatively unseated through the medium of rod 80 and valve stem 79 for permitting flow of the energy medium (fuel or fluid under pressure) from pipe 76 via pipe 78 to the engine.

Except in the respects just described, the control system according to the embodiment of FIG. 3 will operate identically with that already described in connection with FIG. 1, the only difference in said systems being that the shut-off device 4 effects shut-down of an electrically-driven or controlled engine 3 by breaking an eelctrical circuit to cut off the supply of electrical energy to said engine, whereas the shut-off device 66 effects shut-down of an engine (not shown) by cutting off the supply of a non-electrical energy medium thereto through closure of valve 77 that controls, for example, admission of fuel to a diesel or gas-operated engine or controls admission of a gaseous or hydraulic pressure fluid to a turbine.

With respect to both embodiments of the invention, it will be apparent that, if preferred, the lock-over valving function and the energy control function of the shut-off device 4 or 66 may be accomplished by separate devices each performing one of said functions, and that said separate devices may be controlled in parallel by pressure of fluid in separate branches of pipe 38 or may be arranged to function serially such that the respective lock-over communication will be disestablished first and then dependently cause opening of the switch 41 or closure of valve 77.

It is also to be noted that the shuttle valve 63 or its equivalent, and the vent ports 43 or 82 and vent port 61 are preferably provided as a precautionary means to prevent any pressure fluid from being trapped in pipe 64 and thus positively assure that the weight 5 can promptly coaxially realign itself with the valve member 21 when the latter drops due to gravity after the shut-off valve 35 has moved up to shut-off position. However, shuttle valve 63 or its equivalent may be eliminated and pipes 44 and 60 connected directly to pipe 64, provided that vent ports 43 or 82 and 61 are plugged and that the volume of pressure fluid which will thus be trapped in pipes 44, 60, 64 when valve element 21 moves to abnormal position is very low in relation to the combined volume of chambers 26, 37 and pipe 38 so that when the pressure trapped in said pipes 44, 60, 64 equalizes into the chambers 26, 37, pressure in the latter will not be increased to above said chosen value and will thus enable valve 35 to remain in shut-off position. In such event, pressure in chambers 26, 37 may, due to such equalization, increase to above said chosen lower value, and thus bias valve member 21 up to its normal position; however, if there is a considerable differential between said chosen value and chosen lower values of pressure, and if the weight 5 is heavy and its movement about its pivot point (the tip of spring seat 31) is great enough and the conical side of element 19 has a bevel of approximately 45°, the weight 5 can align itself wtih valve member 21 by depressing valve tip 20 against the opposing relatively slight upward force exerted by such reduced fluid pressure in chamber 26.

Also, if desired, a plunger (like plunger 62) may be connected to the pipe 38 side of valve 35 or 67 of device 4 or 66, respectively, thereby eliminating the need for the separate reset valve device 55 and the shuttle valve 63 or its equivalent; and in such case, pipes 64 and 44 would be directly connected to each other. Also, it will be apparent that, if perferred, member 21 may be replaced with a reciprocable member that controls electrical, rather than fluid pressure connections.

In view of the foregoing, and other obvious modifications which may be made in the control systems herein disclosed, the invention is not to be deemed limited except insofar as defined in the appended claims.

Having now described the invention, what I claim as new and desire to secure by Letters Patent is:

1. An inertia-responsive control mechanism comprising stationarily mounted bearing means, weight means tiltably supported on said bearing means and having a normally vertically disposed central axis, an element coaxially depending from the lower end of said weight means, said element having an inclined side and a coaxially arranged tip, vertically reciprocable valve means biased by a bias pressure to a normal position in which its upper tip-like end coaxially abuts the tip of said element and in which it supplies pressure fluid via a port to a chamber, said weight means and element being tiltable out of vertical responsively to inertia to thereby cause said bias pressure to drive said tip-like end up along the inclined side of said element and thereby shift said valve means to an abnormal position in which it cuts off said chamber from said port and connects said chamber to a vent, and control means controlled by pressure of fluid in said chamber and rendered ineffective or effective to perform a preselected control operation according to whether chamber pressure is respectively above or below a chosen value.

2. A control mechanism according to claim 1, including means applying to the upper end of said weight means a concentrically acting downward force which biases said weight means into seating contact with said bearing means and tends to resist tilting of said weight means, whereby increases and decreases in the preselected magnitude of said downward force will effect corresponding increases and decreases respectively, in the degree of inertia force necessary to cause operation of said control means to its effective position.

3. A control mechanism according to claim 1, including a lock-over communication via which pressure fluid may flow to the port of said reciprocable valve means, and other valve means operative to open or close said lock-over communication according to whether pressure of fluid in said chamber respectively exceeds or is less than said chosen value, and means manually operable to supply pressure fluid to said port and by way of said reciprocable valve means in normal position to said chamber to initially charge the latter to above said chosen value so that said other valve means will be actuated to its lock-over communication-opening position and held in said position until pressure in said chamber is reduced responsively to operation of said reciprocable valve means to abnormal position.

4. A control mechanism according to claim 1, including a means for selectively connecting one pipe or another pipe to said port according to which of said pipes contains fluid at the higher pressure, other valve means operative to supply pressure fluid to or vent the one pipe according to whether pressure in said chamber respectively exceeds or is less than said chosen value, reset valve means normally biased to one position to vent the other pipe and operable by an operator to another position to charge said other pipe and hence said port to above said chosen value, whereby said chamber may be initially charged by way of said reset valve means and then maintained charged to above said chosen value by said other valve means until pressure in said chamber is reduced responsively to operation of said reciprocable valve means to its abnormal position.

5. A control mechanism according to claim 1, wherein the bias pressure that biases said valve means to its normal position is pressure fluid at substantially the pressure of fluid existing in said chamber, said bias pressure thus varying wtih chamber pressure such that upon a reduction in chamber pressure to a low value, lower than said chosen value, said valve means will drop by gravity from abnormal position and cut off said chamber from said vent and reconnect said chamber to said port, whereby said weight means will automatically tilt back into coaxial vertical alignment with said valve means but said control means will remain in its effective position because said chamber will not automatically be recharged to above its said chosen value.

6. A control mechanism according to claim 1, wherein the bias pressure that biases said valve means to its normal position is pressure fluid at substantially the pressure of fluid existing in said chamber, said bias pressure thus varying with chamber pressure such that upon a reduction in chamber pressure to a low value, lower than said chosen value, said valve means will drop by gravity from abnormal position through normal position to a lowermost position in which said chamber is cut off from said vent and reconnected to said port and in which said tip-like end is lowered sufficiently to permit the weight means to swing freely into vertical realignment with said valve means, and other valve means operative to supply pressure fluid to said port or vent the latter according to whether pressure in said chamber exceeds or is less than said chosen value, whereby with pressure fluid vented from said port the first-mentioned valve means will remain in lowermost position after said port is reconnected to said chamber.

7. A vibration responsive control mechanism comprising a casing, a vertically disposed cylindrical bearing pin fixedly mounted in said casing and provided at its upper end with a substantially horizontal circular plane surface perpendicular to the axis of said pin, a pendulum-like weight assemblage having formed in its upper portion a coaxially disposed tapered recess terminating with a circular base perpendicular to the axis of the weight assemblage and corresponding in area to said plane surface, said weight assemblage being universally suspended from said bearing pin such that its axis is normally in a vertical position, in which said circular base is in complete abutting contact with said plane surface, and being tiltable, by inertia, out of said vertical position to cause said circular base to be tilted relative to said plane surface, a spring-biased member vertically disposed above said weight assemblage and having a cone-like tip at one end bearing against the upper end of said weight assemblage for exerting thereon a force acting concentrically downwardly at a point coincident with the vertical axis of said pin and yieldingly biasing said circular base against said plane surface and thus providing a moment of force preventing tilting of said weight assemblage out of said vertical position except when vibration exceeds a degree predetermined by the magnitude of said downwardly acting force, a member normally disposed in one position in axial alignment with said weight assemblage, when the axis of the latter is vertically disposed, and operable to a different position in consequence of tilting of said weight assemblage out of such alignment, and control means actuated responsively to operation of said last-mentioned member to its said different position.

8. A vibration responsive control mechanism as defined in claim 7, characterized in that said weight assemblage has a transverse, horizontally disposed bore formed in the said upper portion thereof and into which said tapered recess opens, and further characterized by a support rod in which said bearing pin is supported, said support rod being fixedly mounted in said casing so as to extend horizontally through said transverse bore with sufficient clearance therewith for permitting said tilting motion of said weight assemblage.

References Cited in the file of this patent

UNITED STATES PATENTS

| | | |
|---|---|---|
| 941,033 | Pardee | Nov. 23, 1909 |
| 1,757,353 | Barnard | May 6, 1930 |
| 2,632,455 | Lynn | Mar. 24, 1953 |
| 2,920,636 | Gassner | Jan. 12, 1960 |

FOREIGN PATENTS

| | | |
|---|---|---|
| 5,132 | Great Britain | Feb. 27, 1914 |
| 1,187,122 | France | Mar. 2, 1959 |